July 18, 1939.  H. WILD  2,166,102
TELESCOPE COMPRISING TWO REFRACTING AND ONE REFLECTING SYSTEMS
Filed March 24, 1937
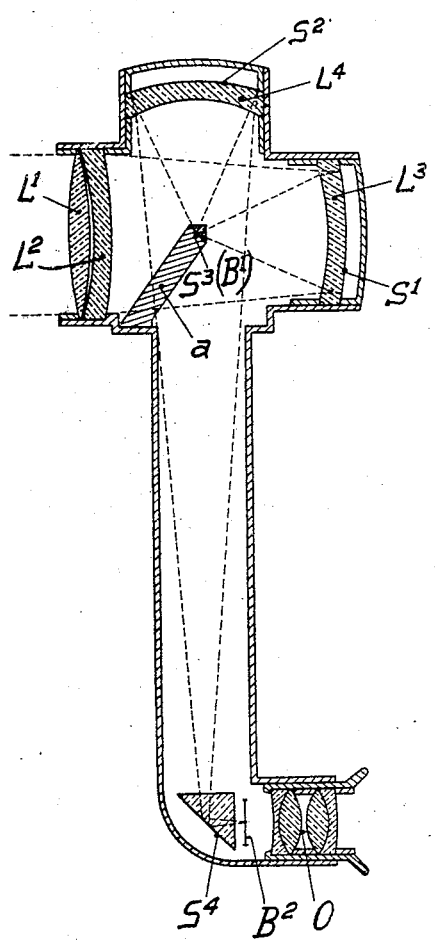
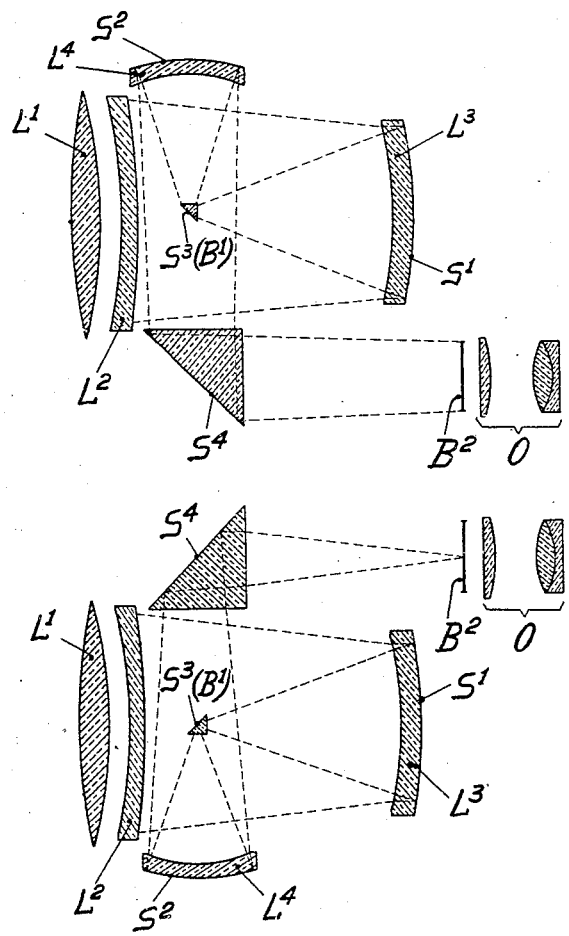
Inventor:
Heinrich Wild Patented July 18, 1939

2,166,102

UNITED STATES PATENT OFFICE 2,166,102

TELESCOPE COMPRISING TWO REFRACTING AND ONE REFLECTING SYSTEMS

Heinrich Wild, Romerburg, Baden, Switzerland

Application March 24, 1937, Serial No. 132,771
In Switzerland April 1, 1936

3 Claims. (Cl. 88—32)

My invention relates to improvements in telescopes in which refracting and reflecting systems are combined and which, in particular, comprise a concave mirror co-axial with a system of collective lenses producing a real image which latter then is reproduced to a larger scale by a second concave mirror and viewed through the usual ocular, and the objects of my improvement are, first, to afford facilities for silver-plating the rear surfaces of the concave mirrors; second, to adapt the refracting as well as the reflecting surfaces to the shape of true spherical surfaces; and, third, to provide means for the elimination of the secondary spectrum.

It is important for the long life of such telescopes that the concave mirrors be silver-plated on the outside or rear surface, and the manufacturing is greatly facilitated by adapting the refracting as well as the reflecting surfaces to the shape of spherical surfaces. These advantages may be obtained, according to my present invention, by making the collective lens system into a composite system so that the latter, in combination with the concave mirrors adapted as negative lenses, may produce the optical correction. The kind of glass for the individual parts may be so chosen that the secondary spectrum practically will be eliminated. This latter object is much better and more easily attained with the arrangement described below than in the case of the ordinary lens telescope.

I attain these objects by the telescope illustrated—by way of two examples of design—in the accompanying drawing, in which—

Fig. 1 is a vertical section of a telescope with a great axial displacement; and Fig. 2 is a schematic showing of the arrangement of the optical parts in a binocular telescope.

In Fig. 1, $L_1$, $L_2$ represent the system of collective lenses, $L_3$ and $L_4$ the two concave mirrors, and $S_3$ and $S_4$ the two plane mirrors (prisms) at the two real images. $a$ is a slender arm for holding fast the prism $S_3$. The real image $B_2$ is viewed through the ocular O.

The crosswise arrangement of the two concave mirrors results in a complete elimination of the interfering rays, i. e. in a complete cutting off of the marginal portions of a beam of light.

Of particular interest and advantage is Fig. 1, in which the two concave mirrors are so situated that their axes lie approximately at right angles, a plane mirror (prism) being provided at the place of the first real image which deflects the beam of light toward the second concave mirror.

If we provide a plane mirror (prism) also in the vicinity of the second real image, we obtain a telescope with a great axial displacement between the incident and emergent rays. Such a telescope permits one to use it behind a protective cover.

Combining two such telescopes in the manner shown in Fig. 2, i. e., deflecting the two optical axes of the individual tubes by means of plane mirrors (prisms) and aligning them parallel, we obtain a binocular telescope of a very compact design.

What I claim and desire to secure by Letters Patent is:

1. A Gregorian reflecting system of the axial-displacement type and of the character described, comprising, in sequence with the path of light, an objective lens system, a single concave spherical lens with silvered rear surface as the primary speculum optically co-axial with the said objective system, a right-angled prism with silvered hypotenuse surface at the focal point of the primary speculum, a single concave spherical lens with silvered rear surface as the secondary speculum the optical axis of which is at right angles to the common optical axis of objective system and primary speculum, and a second right-angled prism with silvered hypotenuse surface immediately in front of the focal point of the secondary speculum from which the rays of light are deflected at right angles into the ocular system of the reflector.

2. A binocular periscope comprising two Gregorian reflecting systems as claimed in claim 1 adjacent and connected to one another, in which the optical axes of the said specula are lying in a vertical plane.

3. A binocular telescope or range finder comprising two Gregorian systems as claimed in claim 1 adjacent and connected to one another, in which the optical axes of the said specula are lying in a horizontal plane.

HEINRICH WILD.